US009366583B2

(12) United States Patent
Xiang et al.

(10) Patent No.: US 9,366,583 B2
(45) Date of Patent: Jun. 14, 2016

(54) SELF-CALIBRATION TEMPERATURE CONTROL DEVICE AND METHOD

(75) Inventors: Xiaofei Xiang, Shenzhen (CN); Zhixiang Zhao, Shenzhen (CN); Shaoguo Chai, Shenzhen (CN)

(73) Assignee: EDAN INSTRUMENTS INC., Shenzhen (CN)

( * ) Notice: Subject to any disclaimer, the term of this patent is extended or adjusted under 35 U.S.C. 154(b) by 0 days.

(21) Appl. No.: 14/398,116

(22) PCT Filed: Jun. 19, 2012

(86) PCT No.: PCT/CN2012/077147
§ 371 (c)(1),
(2), (4) Date: Oct. 30, 2014

(87) PCT Pub. No.: WO2013/185367
PCT Pub. Date: Dec. 19, 2013

(65) Prior Publication Data
US 2015/0083708 A1    Mar. 26, 2015

(30) Foreign Application Priority Data
Jun. 13, 2012 (CN) .......................... 2012 1 0201812

(51) Int. Cl.
*H05B 1/02* (2006.01)
*G01K 15/00* (2006.01)
*G01K 7/22* (2006.01)
*G05D 23/00* (2006.01)
*G05D 23/24* (2006.01)
*G05D 23/19* (2006.01)

(52) U.S. Cl.
CPC ................ *G01K 15/005* (2013.01); *G01K 7/22* (2013.01); *G05D 23/00* (2013.01); *G05D 23/1917* (2013.01); *G05D 23/24* (2013.01)

(58) Field of Classification Search
CPC .............. H05B 3/12; H05B 3/14; H05B 1/02; H05B 1/0288; G01K 15/005; G01K 7/22; G05D 23/00
USPC ................................... 219/494, 501, 497, 505
See application file for complete search history.

(56) References Cited

U.S. PATENT DOCUMENTS 6,036,795 A * 3/2000 Sauron .............. B29C 66/92921
156/304.2
6,246,831 B1 * 6/2001 Seitz .................... F24H 9/2021
219/483

(Continued)

*Primary Examiner* — Mark Paschall
(74) *Attorney, Agent, or Firm* — Symbus Law Group, LLC; Clifford D. Hyra

(57) ABSTRACT

A self-calibration temperature control method and device includes a temperature feedback and control unit, a precise temperature measurement unit, and a temperature calibration unit. The temperature feedback and control unit has a negative temperature coefficient thermistor and an analog feedback control circuit that are connected with a controlled heating element. The temperature calibration unit includes a CPU, a data latch circuit with an input end connected with the CPU through a bus, and a digital potentiometer connected with the temperature feedback and control unit, an output end of the data latch circuit being connected with the digital potentiometer through the bus. The CPU includes a judging unit, a calibration parameter storage module, and a digital potentiometer connection step setting module configured to determine an updated calibration parameter value according to historic calibration parameter data, and further to adjust a step value according to a preset resistance value, thereby adjusting a resistance value of the digital potentiometer.

9 Claims, 4 Drawing Sheets

(56) References Cited

U.S. PATENT DOCUMENTS 6,580,050 B1 * 6/2003 Miller .................... B23K 3/033
219/229

6,888,708 B2 * 5/2005 Brungs .................... H02H 9/08
361/42

7,289,924 B2 * 10/2007 Muniraju ............. G01D 18/008
702/107

* cited by examiner

SELF-CALIBRATION TEMPERATURE CONTROL DEVICE AND METHOD

This application claims the benefit of Chinese patent application No. 201210201812.3, filed Jun. 13, 2012, which is hereby incorporated by reference in its entirety.

FIELD OF THE INVENTION

The invention relates to the field of temperature adjustment, in particular to a self-adjustment temperature control device and method.

BACKGROUND OF THE INVENTION

In many situations where temperature control is required, an analog feedback type temperature control method is generally adopted, for example, NTC (also known as Negative Temperature Coefficient thermistor) feedback heater temperature value is adopted and an analog circuit negative feedback principle is utilized to form a closed loop control system.

However, this method adopts a resistor to set the finally reached stable temperature of a system, as long-term drift exists in the resistor, long-term drift inevitably exists in the final stable temperature of the system, thus, long-term temperature accuracy of the system is hard to be controlled, and large technical defect exists; and this method is generally only used in the situation that the requirement of system temperature control precise is not so high.

Another digital temperature control circuit adopts a precise resistor and a PID (also known as Proportional Integral Derivative) algorithm to dynamically adjust the system temperature in real-time. This method adopts a precise resistance temperature sensor, thus, the long-term drift problem of the temperature sensor can be avoided. However, as this control circuit is of digital type, the heating current in the heater is often switched between full power and zero power, the pulsation is quite great; when the digital temperature control circuit with such a structure is applied into medical equipments, it will bring great interference to the precise signal measurement circuits of the medical equipments (such as a blood gas analyzer).

In addition, as the temperature control system needs to operate PID algorithm in real-time, the load of CPU is great, and the interference problem brought is also more prominent. This way is hard to solve the inherent interference problem. In addition, once the CPU does not work, the heating current possibly keeps at the maximum all the time to bring potential safety hazards. To solve this problem, a series of protection circuits are needed to add, the system is complex and high in cost. Thus, this way has many disadvantages which are hard to be overcome.

To sum up, the traditional temperature control technology has many defects.

DISCLOSURE OF THE INVENTION

Technical Problem

In order to overcome above defects, the present invention aims to provide an efficient, reliable and accurate self-calibration temperature control device.

The purpose of the present invention is to provide a temperature control method adopted in the temperature control device with above structure.

Solution to the Problem

Technical Solution

The purpose of the present invention is realized through the following technical scheme:

The present invention discloses a self-calibration temperature control device, which mainly comprises:

a temperature feedback and control unit connected with a controlled heating element to control the work state thereof, a precise temperature measurement unit connected with the controlled heating element to measure the stable temperature thereof, and a temperature calibration unit connected with the precise temperature measurement unit and the temperature feedback and control unit; the temperature calibration unit is used for obtaining temperature from the precise temperature measurement unit, dynamically calibrating temperature drift, and inputting the calibrated result into the temperature control and feedback unit;

the temperature feedback and control unit comprises: a negative temperature coefficient thermistor and an analog feedback control circuit that are connected with the controlled heating element to control the final stable temperature of the controlled heating element reaching the setting value through analog feedback control circuit;

the temperature calibration unit comprises: a CPU with a preset temperature range value and a preset resistance adjustment step value, being connected with the precise temperature measurement unit, a data latch circuit with an input end connected with the CPU through a bus, and a digital potentiometer connected with the temperature feedback and control unit, and an output end of the data latch circuit is connected with the digital potentiometer (hereinafter referred to as DDP) through the bus;

the CPU comprises: a judging unit used for judging whether the temperature value measured by the precise temperature measurement circuit is within a preset range, a calibration parameter storage module used for storing historical calibration parameter data, and a digital potentiometer connection step setting module; the digital potentiometer connection step setting module is configured to determine an updated calibration parameter value according to the historic calibration parameter data, and further adjust a step value according to a preset resistance value.

As an improvement, the temperature feedback and control unit comprises an NTC thermistor, a precise setting resistor, a voltage reference circuit, a ½ voltage division circuit, a first buffer circuit, a second buffer circuit, an integrating circuit, an inverse proportional amplifier circuit, a voltage summing circuit, a level mapping circuit and a DC/DC module circuit, wherein one end of the NTC thermistor is earthed, the other end of the NTC thermistor is connected with the precise setting resistor; the other end of the NTC thermistor is further connected with a non-inverting input end of the first buffer circuit;

one end of the precise temperature setting resistor is connected with an NTC resistor, and further connected with the non-inverting input end of the first buffer circuit, and the other end of the precise temperature setting resistor is connected with the digital potentiometer;

the output voltage of the voltage reference circuit is connected with the digital potentiometer; and meanwhile, the output voltage thereof is further connected with the first resistor of the ½ voltage division circuit;

the ½ voltage division circuit comprises a first resistor, a second resistor and a first operational amplifier; the first resistor is connected with the output of the voltage reference circuit; the other end of the first resistor is connected with the second resistor; the other end of the first resistor is further connected with the non-inverting end of the first operational amplifier; the first operational amplifier is connected into a voltage follower way, the inverting end of the first operational amplifier is connected with the output end; the output end of the first operational amplifier is connected with the non-inverting end of a third operational amplifier, and the output end of the first operational amplifier is further connected with the non-inverting end of a fourth operational amplifier;

the first buffer circuit is structured by the voltage follower which is connected by the second operational amplifier;

the second buffer circuit is structured by the voltage follower which is connected by the first operational amplifier; the non-inverting input end of the first operational amplifier is connected with the first resistor of the ½ voltage division circuit; the inverting end of the first operational amplifier is connected with the output end of the first operational amplifier; the output end operating and amplifying the first operational amplifier is connected with the non-inverting end of the third operational amplifier which is operated and amplified by the integrator, and the output end operating and amplifying the first operational amplifier is further connected with the non-inverting end of the fourth operational amplifier which is operated and amplified by the inverse proportional amplifier circuit;

the integrating circuit comprises a fifth resistor, a third operational amplifier and a feedback capacitor; one end of the fifth resistor is connected with the buffer output end and is further connected with the third resistor; and the other end of the fifth resistor is connected with the inverting input end of the third operational amplifier and is further connected with one end of the feedback capacitor; one end of the feedback capacitor is connected with the inverting end of the third operational amplifier; and the other end of the feedback capacitor is connected with the output end which operates and amplifies the third operational amplifier; the output of the third operational amplifier is connected with a sixth resistor of the voltage summing circuit; the non-inverting end of the third operational amplifier is connected with the output end of the first operational amplifier in the buffer circuit;

the reverse proportion amplifier circuit comprises a fourth operational amplifier, a third resistor and a fourth resistor; the non-inverting end of the fourth operational amplifier is connected with the output end of the first operational amplifier; the inverting end of the fourth operational amplifier is connected with a common node formed by the third and fourth resistors; the other end of the third resistor is connected with the output of the second operational amplifier and is further connected with one end of the fifth resistor; one end of the fourth resistor is connected with the inverting end of the fourth operational amplifier and is further connected with the third resistor; and the other end of the fourth resistor is connected with the output of the fourth operational amplifiers;

the voltage summing circuit consists of two equivalent sixth and seventh resistors; one end of the sixth resistor is connected with the output of the integrator; and the other end of the sixth resistor is connected with the seventh resistor; one end of the seventh resistor is connected with the output of the reserve proportion amplifier circuit; and the other end of the seventh resistor is connected with the sixth resistor; The common node formed by the seventh resistor and the sixth resistor is connected with the input end of the level mapping circuit;

the level mapping circuit consists of a first voltage follower, a second voltage follower, an eighth resistor and a ninth resistor; the non-inverting end of the first voltage follower is connected with the common node formed by the sixth resistor and the seventh resistor of the voltage summing circuit; the inverting end of the first voltage follower is connected with the output; the output of the first voltage follower is further connected with one end of the eighth resistor; the other end of the eighth resistor is connected with a common node formed by the ninth resistor; this common node is connected with the non-inverting end of the second voltage follower; one end of the ninth resistor is connected with the eighth resistor and is further connected with the non-inverting end of the second voltage follower; and the other end of the ninth resistor is earthed;

the non-inverting end of the second voltage follower is connected with the eighth resistor and is further connected with the ninth resistor; the inverting end of the second voltage follower is connected with the output; and the output of the second voltage follower is connected with one end of an eleventh resistor;

the DC/DC module circuit consists of a DC/DC chip and external discrete components; the external discrete component comprises an input capacitor, a boot capacitor, a freewheeling diode, an energy storage inductor and an output filter capacitor; the first output voltage and the second output voltage are provided with resistors; one end point of the input capacitor is connected with the DC/DC chip, and the other end thereof is earthed; and the DC/DC chip is connected with power supply.

Moreover, the precise temperature measurement unit comprises a Resistance Temperature Detector (RTD) resistor and a precise temperature measurement circuit connected with the RTD resistor; two ends of the RTD resistor are connected with the precise temperature measurement circuit.

As an improvement, the temperature calibration unit comprises a digital potentiometer, a CPU circuit and a digital latch circuit, wherein the digital potentiometer is connected with the precise temperature setting circuit in series; one end of the digital potentiometer is connected with the precise setting resistor, and the other end of the digital potentiometer is connected with the output of the voltage reference circuit; the CPU circuit is connected with the precise temperature measurement circuit through a data bus interface; the input end of the data latch circuit is connected with the CPU circuit through a bus, and the output end of the data latch circuit is connected with the digital potentiometer through a bus.

Of course, as an improvement, the controlled heating element unit is provided within a heater line to heat the system to be measured; one end of the heater line is earthed, and the other end of the heater line is connected with the output end of the DC/DC module circuit.

Another purpose of the present invention is realized through the following technical scheme:

A temperature control method adopted for the temperature control device with above structure, comprises the steps as follows:

Step I, presetting temperature range value and presetting resistance adjustment step value;

Step II, presetting at least one predetermined time length;

Step III, after step II, collecting the temperature value corresponding to the precise temperature measurement unit in the predetermined duration, and comparing the obtained temperature value with the preset temperature range value;

Step IV, if the temperature value collected and obtained in Step III is excluded in the preset temperature range value, adjusting the step value according to the preset resistance value and adjusting the resistance value of the digital potentiometer, and then returning to Step III;

Step V, if the temperature value collected and obtained in Step III is included in the preset scene parameter threshold range, returning to Step III.

Further, at least a first predetermined duration and a second predetermined duration are preset in Step II;

in Step IV, if the temperature value collected and obtained in the first predetermined duration of Step III is excluded in the preset temperature range value, adjusting the step value according to the preset resistance value and further adjusting the resistance value of the digital potentiometer;

after each step value is adjusted, judging whether the collected temperature value measured by the precise temperature measurement unit is included in the preset temperature range value in the second predetermined duration;

if the temperature value is included in the preset scene parameter threshold range, returning to Step III;

if the temperature value collected and obtained is excluded in the preset temperature range value, adjusting the step value according to the preset resistance value and adjusting the resistance value of the digital potentiometer, and then returning to Step III.

As an improvement, at least a first predetermined duration, a second predetermined duration and a third predetermined duration are preset in Step II;

in Step IV, if the temperature value collected and obtained in the first predetermined duration of Step III is excluded in the preset temperature range value, adjusting the step value according to the preset resistance value and further adjusting the resistance value of the digital potentiometer;

after each step value is adjusted, judging whether the collected temperature value measured by the precise temperature measurement unit is included in the preset temperature range value in the second predetermined duration;

if the temperature value is included in the preset scene parameter threshold range, returning to Step III;

if the temperature value collected and obtained is excluded in the preset temperature range value, adjusting the step value according to the preset resistance value and adjusting the resistance value of the digital potentiometer, and then returning to Step III and storing the number of adjusted steps.

after Step V, further comprises:

Step VI, after collecting the temperature value corresponding to the precise temperature measurement unit every third predetermined duration, comparing the obtained temperature value with the preset temperature range value, and judging whether the obtained temperature value is included in the preset range;

if the temperature value is included in the preset scene parameter threshold range, returning to Step III;

if the temperature value is excluded in the preset range value, controlling the resistance value of the digital potentiometer according to the number of adjusted step which is stored at the last time, and then again collecting the temperature value measured by the precise temperature measurement unit in real-time;

Step VII, if the temperature value is included in the preset scene parameter threshold range, returning to Step III;

if the temperature value is still excluded in the preset temperature value range, continuously adjusting the step value according to the preset resistance value until the collected temperature value measured by the precise temperature measurement unit is included in the temperature value range, and storing the number of the current adjusted step, and returning to Step III.

As another improvement, at least a first predetermined duration and a third predetermined duration are preset in Step II;

in Step IV, if the temperature value collected and obtained in the first predetermined duration of Step III is excluded in the preset temperature range value, adjusting the step value according to the preset resistance value and further adjusting the resistance value of the digital potentiometer;

if the temperature value is included in the preset scene parameter threshold range, returning to Step III;

if the temperature value collected and obtained is excluded in the preset temperature range value, adjusting the step value according to the preset resistance value and adjusting the resistance value of the digital potentiometer, and then returning to Step III and storing the number of adjusted step;

after Step V, further comprises:

Step VI, after collecting the temperature value corresponding to the precise temperature measurement unit every third predetermined duration, comparing the obtained temperature value with the preset temperature range value, and judging whether the obtained temperature value is included in the preset range;

if the temperature value is included in the preset scene parameter threshold range, returning to Step III;

if the temperature value is excluded in the preset range value, controlling the resistance value of the digital potentiometer according to the number of adjusted steps which is stored at the last time, and then again collecting the temperature value measured by the precise temperature measurement unit in real-time;

Step VII, if the temperature value is included in the preset scene parameter threshold range, returning to Step III;

if the temperature value is still excluded in the preset temperature value range, continuously adjusting the step value according to the resistance value until the collected temperature value measured by the precise temperature measurement unit is included in the temperature value range, storing the number of the current adjusted step, and returning to Step III.

BENEFICIAL EFFECTS OF THE INVENTION

Beneficial Effects

The present invention has advantages and beneficial effects as follows: in the temperature control device of the self-calibration system adopting above structure, the real-time temperature value of the controlled heating element is collected through the precise temperature measurement unit; the temperature value is transmitted to the CPU through the data bus; the CPU outputs the required resistance value to the digital potentiometer through the data bus; once the judging unit of the CPU finds that the new balance temperature point of the controlled heating element is excluded in the preset range, the CPU will continuously adjust the resistance value of the digital potentiometer, it cycles until the controlled heating element finally reaches the preset range, and meanwhile, once CPU finds the parameter value, the calibration parameter storage module stores the parameter value for facilitating subsequent calibration search rules;

after performing sampling and storage according to previous temperature calibration data, CPU can obtain approximate parameter value range of the calibration point; after the value is output to the digital potentiometer, the temperature control device of the self-calibration system only needs few adjustment steps to enable the controlled heating element to precisely reach the preset range, thus, the calibration time is greatly shortened, and the efficiency of the system temperature calibration is greatly improved.

Meanwhile, as the data latch is adopted to store the data output by the CPU, even if the CPU does not work, the data is not lost, and the temperature control value for heating is not affected, thus, the reliability of the data calibration system can be effectively guaranteed.

Of course, adopting the temperature control method of the present invention further has above advantages.

BRIEF DESCRIPTION OF THE DRAWINGS

Description of the Drawings

For easy illustration, the present invention is described in details with reference to the following preferred embodiments and attached drawings.

Figure 1:
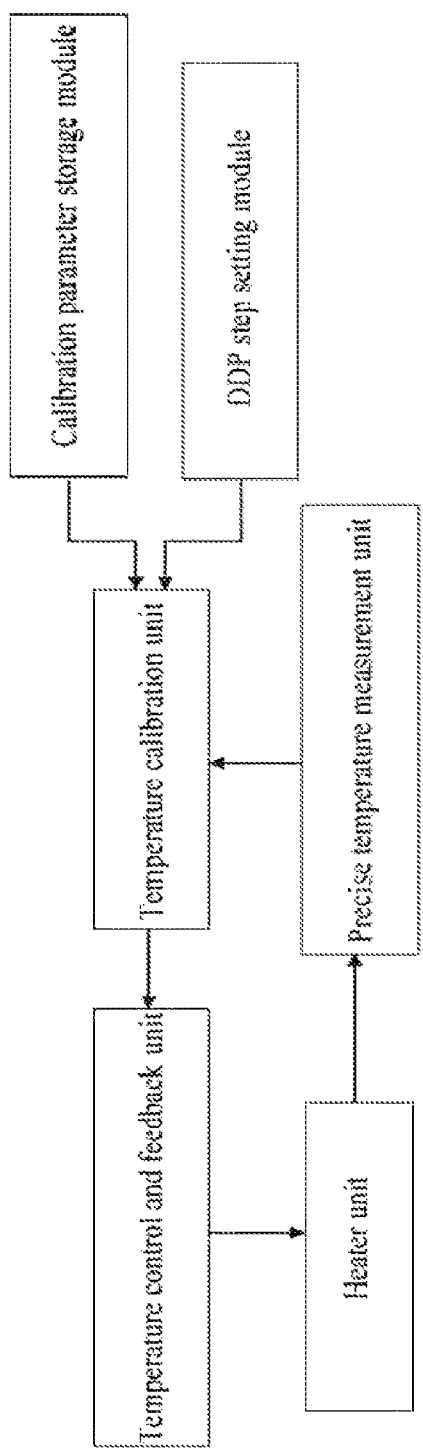
Figure 2:
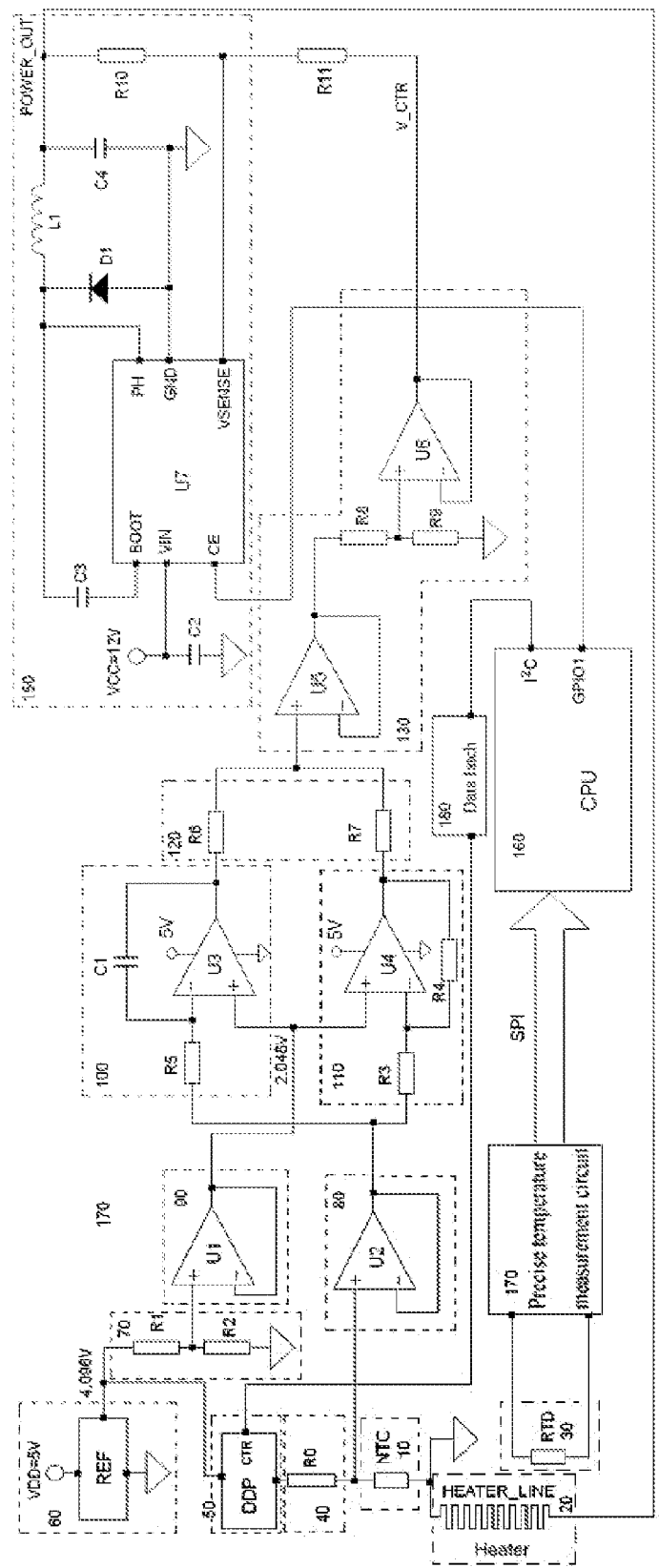
Figure 3:
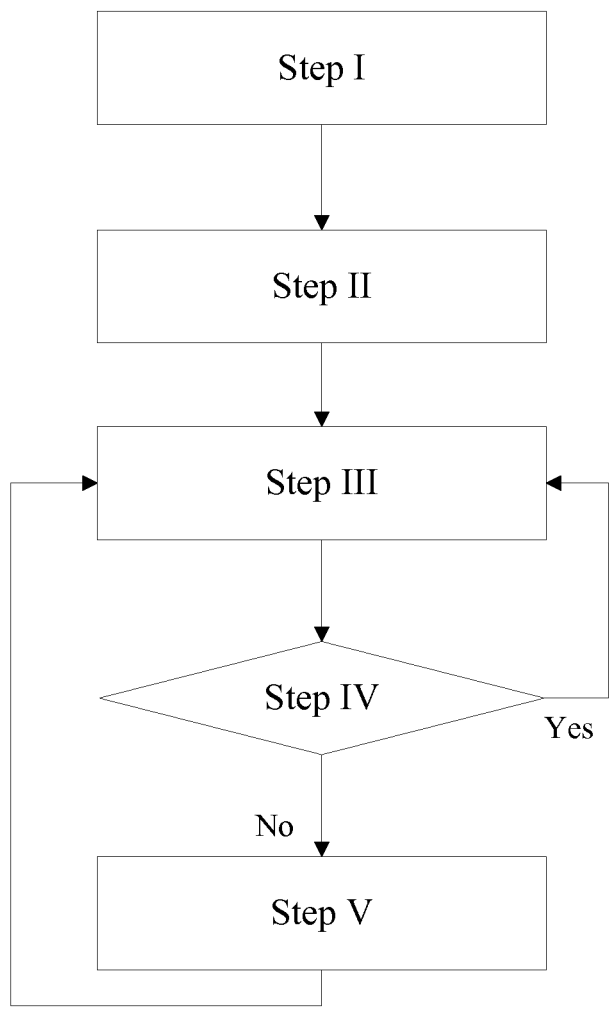
Figure 4:
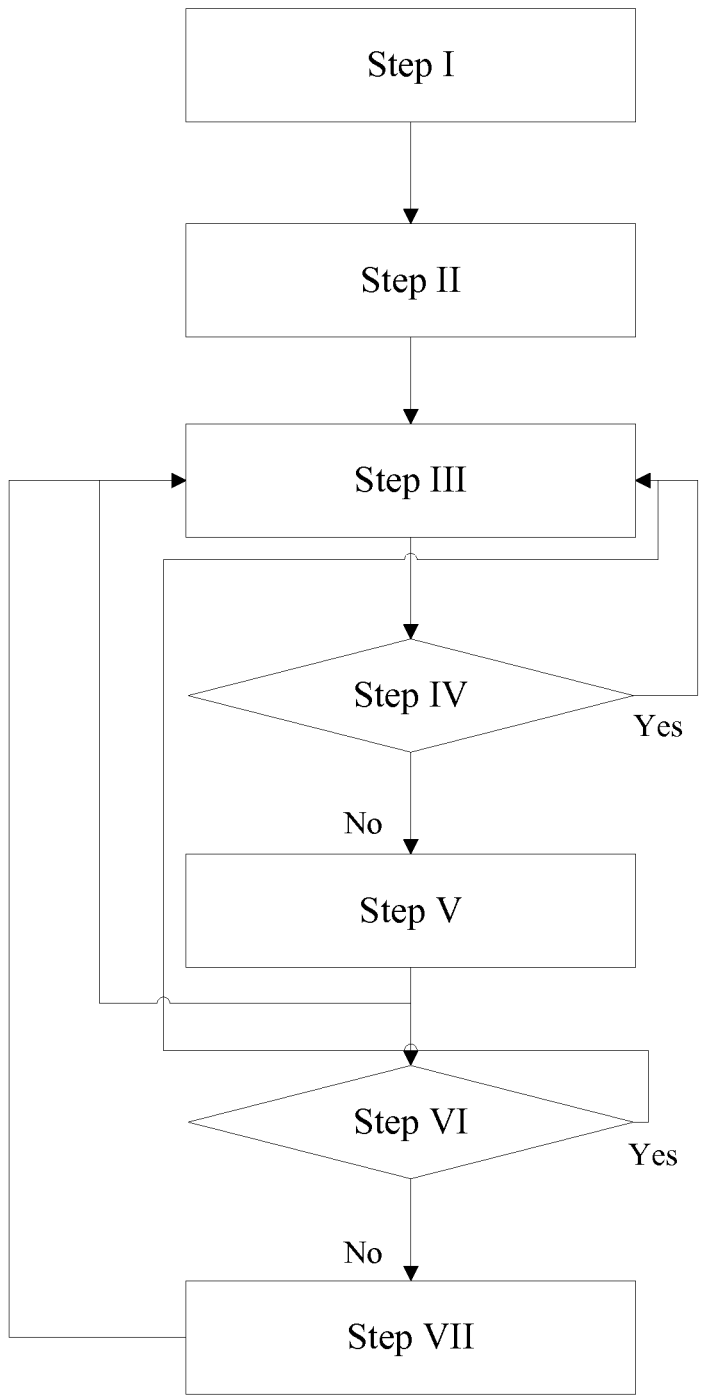

FIG. 1 is a block diagram of the device in the present invention;

FIG. 2 is a schematic diagram of the circuit in the present invention;

FIG. 3 is a flow chart of the method in the present invention;

FIG. 4 is of a step flow block diagram for another embodiment of the method in the present invention.

PREFERRED EMBODIMENTS OF THE INVENTION

Embodiments of the Invention

In order to make the purpose, technical scheme and advantages of the present invention are clearer, the present invention is described below with reference to accompanying drawings and embodiments in detail. It should be understood that the following described embodiments are only used for explaining the invention instead of limiting the invention.

See FIG. 1 and FIG. 2, the present invention discloses a self-calibration temperature control device, which mainly comprises:

a temperature feedback and control unit connected with a controlled heating element to control the work state thereof, a precise temperature measurement unit connected with the controlled heating element to measure the stable temperature thereof, and a temperature calibration unit connected with the precise temperature measurement unit and the temperature feedback and control unit; the temperature calibration unit is used for obtaining temperature from the precise temperature measurement unit, dynamically calibrating temperature drift, and inputting the calibrated result into the temperature control and feedback unit;

the temperature feedback and control unit comprises: a negative temperature coefficient thermistor and an analog feedback control circuit that are connected with a controlled heating element to control the final stable temperature of the controlled heating element reaching the setting value through analog feedback control circuit; the temperature calibration unit comprises: a CPU with a preset temperature range value and a preset resistance adjustment step value, being connected with the precise temperature measurement unit, a data latch circuit with an input end connected with the CPU through a bus, and a digital potentiometer connected with the temperature feedback and control unit, and an output end of the data latch circuit is connected with the digital potentiometer (hereinafter referred to as DDP) through the bus;

the CPU comprises: a judging unit used for judging whether the temperature value measured by the precise temperature measurement unit is within a preset range, a calibration parameter storage module used for storing historical calibration parameter data, and a digital potentiometer connection step setting module, the digital potentiometer connection step setting module is configured to determine an updated calibration parameter value according to the historic calibration parameter data, and further adjust a step value according to a preset resistance value.

The temperature feedback and control unit comprises an NTC thermistor 10, a precise setting resistor 40, a voltage reference circuit 60, a ½ voltage division circuit 70, a first buffer circuit 80, a second buffer circuit 90, an integrating circuit 100, an inverse proportional amplifier circuit 110, a voltage summing circuit 120, a level mapping circuit 130 and a DC/DC module circuit 150, wherein one end of the NTC thermistor 10 is earthed, the other end of the NTC thermistor is connected with the precise setting resistor 40; the other end of the NTC thermistor 10 is further connected with a non-inverted input end of the first buffer circuit 80; one end of the precise temperature setting resistor 40 is connected with the NTC resistor 10, and further connected with the non-inverted input end of the first buffer circuit 80, and the other end of the precise temperature setting resistor 40 is connected with the digital potentiometer 50. The precise temperature setting resistor is a metal foil resistor or a gold seal resistor with a precision of 0.1%, the resistance value thereof is equal to the resistance value of NTC after the temperature of the heating element reaching the preset temperature;

the output voltage (typical value: 4.096V) of the voltage reference circuit 60 is connected with the digital potentiometer 50; and meanwhile, the output voltage of the voltage reference circuit is further connected with a first resistor R1 of the ½ voltage division circuit 70; the function of the voltage reference circuit is to provide stable voltage reference source for the system; the ½ voltage division circuit 70 comprises the first resistor R1, a second resistor R2 and a first operational amplifier U1; the first resistor R1 is connected with the output of the voltage reference circuit 60; the other end of the first resistor R1 is connected with the second resistor R2, and the other end of the first resistor R1 is further connected with the non-inverting end of the first operational amplifier U1; the first operational amplifier U1 is connected into a voltage follower way, the inverting end of the first operational amplifier is connected with the output end; the first operational amplifier U1 outputs 2.048V reference voltage which is to be used as the input reference voltage of the integrator 100 and the inverse proportional amplifier 110; the output end of the first operational amplifier U1 is connected with the non-inverting end of a third operational amplifier U3; and the output end of the first operational amplifier U1 is further connected with the non-inverting end of a fourth operational amplifier U4. The main function of the voltage division circuit is to divide the reference voltage into two halves as the input voltage reference of the integrator and the reverse proportional amplifying circuit. R1 and the second resistor R2 are precise 10K 0.1% resistors; the first buffer circuit 80 consists of the voltage follower which is formed by connecting the second operational amplifier U2; the second buffer circuit 90 is structured by the voltage follower which is formed by connecting the first operational amplifier U1; the non-inverting input end of the first operational amplifier U1 is connected with the first resistor R1 of the ½ voltage division circuit; the inverting end of the first operational amplifier U1 is connected with the output end of the first operational amplifier U1; the output end operating and amplifying the first operational amplifier U1 is connected with the non-inverting end of the third operational amplifier U3 which is operated and amplified by the integrator, and the output end operating and amplifying the first operational amplifier U1 is further connected with the non-inverting end of the fourth operational amplifier U4 which is operated and amplified by the inverse proportional amplifier circuit;

the integrating circuit 100 comprises a fifth resistor R5, a third operational amplifier U3 and a 1 uF feedback capacitor C1; one end of the fifth resistor R5 is connected with the output end of buffer U2, one end of the fifth resistor R5 is further connected with the third resistor R3, and the other end of the fifth resistor R5 is connected with the inverting input end of the third operational amplifier U3, and the other end of the fifth resistor R5 is further connected with one end of the feedback capacitor C1; one end of the feedback capacitor C1 is connected with the inverting end of the third operational amplifier U3, and the other end of the feedback capacitor C1 is connected with the output end of the third operational amplifier U3; the output of the third operational amplifier U3 is connected with a sixth resistor R6 of the voltage summing circuit 120; the non-inverting end of the third amplifier U3 is connected with the output end of the first operational amplifier U1 in the buffer circuit 90; the inverse proportional amplifier circuit 110 comprises a fourth operational amplifier U4, a third resistor R3 and a fourth resistor R4; the non-inverting end of the fourth operational amplifier U4 is connected with the output end of the first operational amplifier U1; the inverting end of the fourth operational amplifier U4 is connected with a common node formed by the third and fourth resistors R3 and R4; the other end of the third resistor R3 is connected with the output of the second operational amplifier U2, and the other end of the third resistor R3 is further connected with one end of the fifth resistor R5; one end of the fourth resistor R4 is connected with the inverting end of the fourth operational amplifier U4, one end of the fourth resistor R4 is further connected with the third resistor R3, and the other end of the fourth resistor R4 is connected with the output of the fourth operational amplifier U4; the circuit summing circuit 120 consists of two equivalent sixth and seventh resistors R6 and R7; one end of the sixth resistor R6 is connected with the output of the integrator 100, and the other end of the sixth resistor R6 is connected with the seventh resistor R7; one end of the seventh resistor R7 is connected with the output of the inverse proportional amplifier circuit 110, and the other end of the seventh resistor R7 is connected with the sixth resistor R6. The common node formed by the seventh resistor R7 and the sixth resistor R6 is connected with the input end of the level mapping circuit 130; the level mapping circuit 130 consists of a first voltage follower U5, a second voltage follower U6, an eighth resistor R8 and a ninth resistor R9; the non-inverting end of the first voltage follower U5 is connected with the common node formed by the sixth resistor R6 and the seventh resistor R7 of the voltage summing circuit; the inverting end of the first voltage follower U5 is connected with the output; and the output of the first voltage follower U5 is further connected with one end of the eighth resistor R8. The other end of the eighth resistor R8 forms a common node with the ninth resistor R9, and the common node is connected with the non-inverting end of the second voltage follower U6; one end of the ninth resistor R9 is connected with the eighth resistor R8, and one end of the ninth resistor R9 is further connected with the non-inverting end of the second voltage follower U6. The other end of the ninth resistor R9 is earthed; the non-inverting end of the second voltage follower U6 is connected with the eighth resistor R8, the non-inverting end of the second voltage follower U6 is further connected with the ninth resistor R9; the inverting end of the second voltage follower U6 is connected with output, and the output of the second voltage follower U6 is connected one end of an eleventh resistor R11.

The DC/DC module circuit 150 consists of a DC/DC chip U7 and external discrete components; the external discrete component comprises an input capacitor C2, a boot capacitor C3, a freewheeling diode D1, an energy storage inductor L1 and an output filter capacitor C4; the first output voltage and the second output voltage are provided with resistors R10 and R11; one end point of the input capacitor C2 is connected with VIN of U7, and the other end thereof is earthed; VIN of U7 is connected with power supply VCC; the enable end CE of the DC/DC chip U7 is connected with GPIO of CPU; BOOT pin of U7 is connected with the capacitor C3; GND pin of U7 is earthed, and the other end of the capacitor C3 is connected with PH pin of U7. The other end of the capacitor C3 is further connected with the negative end of the freewheeling diode D1. The other end of the capacitor C3 is further connected with the energy storage inductor L1. The negative end of the freewheeling diode D1 is connected with PH pin of U7, one end of C3 and one end of the energy storage inductor L1 synchronously. The positive end of the freewheeling diode D1 is earthed. One end of the energy storage inductor L1 is connected with one end of C3, one end of the energy storage inductor L1 is further connected with PH pin of U7, one end of the energy storage inductor L1 is further connected with the negative end of D1, and the other end of the energy storage inductor L1 is connected with C4, the other end of the energy storage inductor L1 is further connected with the first resistor R10, and the other end of the energy storage inductor L1 is further connected with one end of the heater line HEATER_LINE. One end of C4 is connected with L1, one end of C4 is further connected with R10, one end of C4 is further connected with one end of the heater line HEATER_LINE, and the other end of C4 is earthed. One end of R10 is connected with L1, one end of R10 is further connected with C4, and one end of R10 is further connected with one end of the heater line HEATER_LINE. The other end of R10 is connected with VSENSE pin of U7, and the other end of R10 is further connected with one end of R11. One end of R11 is connected with VSENSE pin of U7, and the other end of R11 is further connected with R10. The other end of R11 is further connected with the output end of the second voltage follower U6.

Further, the precise temperature measurement unit comprises an RTD (also know as resistor temperature detector) resistor 30 and a precise temperature measurement circuit 170 connected with the same; the two ends of RTD resistor 30 are connected with the precise temperature measurement circuit 170; the RTD resistor is designed by a platinum resistance process, has good long-term stability and is able to detecting the temperature of the heater.

As an improvement, the temperature calibration unit comprises a digital potentiometer 50, a CPU circuit 160 and a digital latch circuit 180, wherein the digital potentiometer 50 is connected with the precise temperature setting circuit in series; one end of the digital potentiometer 50 is connected with the precise setting resistor 40, and the other end of the digital potentiometer 50 is connected with the output of the voltage reference circuit 60; in order to precisely adjust the temperature precision, the level of the digital potentiometer should be large enough, and the typical level is 256. The digital potentiometer 50 is connected with the CPU through an SPI interface. The output resistance of the digital potentiometer is precisely controlled by the CPU. The CPU circuit 160 is an 8-bit or above singlechip, and further can be formed by DSP. The CPU circuit is connected with the precise temperature measurement circuit 170 through the SPI data bus interface; the CPU circuit is connected with the control port CTR of the digital potentiometer DDP through an I2C interface. The CPU circuit is connected with CE pin of U7 through GPIO. The CPU circuit comprises FLASH configured with an SRAM (static random access memory) unit. The input of the data latch circuit 180 is connected with CPU circuit 160 through the bus, and the output of the data latch circuit is connected with the digital potentiometer DDP through the bus; the function of the data latch is to save the data output by CPU, even if CPU does not work, the data is not lost, the temperature control value of heating is not affected, thus, the reliability of the data calibration system can be effectively guaranteed. The controlled heating element unit 20 is provided within a heater line HEATER_LINE to heat the system to be measured; one end of the heater line is earthed, and the other end of the heater line is connected with the output POWER_OUT of the DC/DC module circuit 150.

The working principle of above circuit is as follows: the immediate resistance value of NTC resistor reflects the current heater temperature. When the temperature rises, the resistance value of the NTC resistor is reduced. When the temperature of NTC resistor is 37° C., the typical resistance value is 53 Kohm. Therefore, in the preferred embodiment, the resistance value of the precise temperature setting resistor is 51.5 Kohm. The full scale output resistance of DDP is 1 Kohm, and there are 512 segment values. Each segment is 1.95 ohm.

The temperature control principle of the present invention is illustrated as follows: when CPU sets DDP to enable the output resistance to be 0.5 Kohm, the total resistance of the precise setting resistor 40 and DDP which are connected in series is 52 Kohm. When the heater temperature is below 37° C., as NTC resistor is a negative temperature coefficient resistor, the resistance value at this time is far more than 52 Kohm, the voltage at the voltage division point of NTC and R0 is certainly higher than 2.048V, after being buffered by U2, the voltage is input into the inverse proportional amplifier circuit 110 (consisting of U4, R3 and R4). As the potential of the non-inverting end of U4 is 2.048V, it is equivalent to input a negative signal to U4. Under the function of high closed-loop gain (with a typical value of 240 times) of the inverse proportional amplifier circuit, the output signal of U4 is close to 0V. After the output of U2 passes through the integrator, and due to the short integration time, U2 will output an intermediate voltage value between 0V and 2.048V, thus, after the two signals of U2 and U3 pass through the summing circuits R6 and R7, the signals will become a signal close to 0V. And after the signal passes through the mapping circuit, the level is further attenuated as 40% of the original, thus, attenuated signal is closer to 0V, and the signal will be input into the voltage output control end V_CTR (namely connected with R11) of DC/DC.

Under normal situation, when V_CTR equals to 0V, U7 will output the maximum voltage of 10V. When V-CTR is close to 0V, U7 will output a voltage of 5-10V. The voltage is totally added on the heater line HEATER_LINE, thus, the heater line begins to heat and the temperature of the heater line continuously rises.

When the temperature of the heater is higher than 37° C., the resistance value of NTC resistor is less than 52 Kohm, and the circuit just works the opposite; the level mapping circuit will output a voltage about 2V, and the output of U7 is cut off, the output voltage is 0V, and the heater loses heating power and begins to cool. Obviously, as long as the temperature of the heater is not 37° C., the whole control circuit will automatically feedback and adjust the temperature of the heater so as to enable the temperature to finally reach the stable setting value of 37° C.

It should be noted that above inventive device is analog feedback adjustment, adjusted voltage is linearly increased or reduced, thus, the heating current pulse of the heating circuit is very small. This is very beneficial for integration of other analog circuits, and does not interfere with the performances of other analog circuits. However, the resistance value of the NTC resistor when the temperature is 37° C. is possibly changed gradually along the time. Thus, a single analog feedback method cannot realize long-term system temperature control precision, so calibration circuits such as DDP, CPU and precise temperature measurement circuit are required.

The temperature calibration principle is as follows: CPU periodically checks the finally stable temperature of the heater, and the RTD resistor in the heater is of a precise platinum resistance temperature sensor with the long-term drift being no more than 0.01° C. per year, thus, it is very suitable for precise temperature measurement. The heater temperature value is collected by the precise temperature measurement circuit 170 in real-time, and the temperature value is transmitted to CPU through the data bus. According to the software implementation method described below, CPU outputs the required resistance value to DDP through I2C, after a short period of time, the temperature of the heater is driven by the new parameters of the setting resistor to reach the heat balance again. As long as the new balance temperature point of the heater found by CPU is not 37° C., CPU will continuously adjust the resistance value of DDP, it cycles until the heater finally reaches the stable temperature of 37° C. Based on the principle, the time for calibrating the temperature at the first time may be relatively long. However, once CPU finds the parameter value, CPU will store it for facilitating subsequent calibration search rule. The principle of DDP step setting module is as follows: after plotting points according to the previous temperature calibration data, CPU could obtain an NTC resistor long-term drift approximate curve, thus, CPU can predict approximate parameter value of the next calibration point. The value is output to DDP, and the heating system can precisely reach 37° C. only needing few adjustment steps. The calibration time is greatly shortened. Thus, adoption of DDP step setting module can greatly improve the efficiency of the system temperature calibration. It should be noted that the typical resistance of NTC resistor is 52 Kohm when the temperature is 37° C., and the temperature change is between −0.02° C. and +0.02° C., and the resistance value change is about 4.8 ohm. In the embodiment, the resistance value of each segment of DDP is 1.95 ohm, which is far less than the change value of the resistance when the temperature change of the NTC is ±0.02° C.; the temperature setting error is only ±0.008° C.; if higher requirement is needed, select DDP with more segments. In addition, the precise temperature measurement circuit can be accurate to ±0.01° C., thus, ±0.02° C. temperature control precise of the system can be guaranteed.

A temperature control method adopted for the temperature control device with above structure, comprises the steps as follows (as shown in FIG. 3):

Step I, presetting temperature range value and presetting resistance adjustment step value;

Step II, presetting at least one predetermined time length;

Step III, after step II, collecting the temperature value corresponding to the precise temperature measurement unit in the predetermined duration, and comparing the obtained temperature value with the preset temperature range value;

Step IV, if the temperature value collected and obtained in Step III is excluded in the preset temperature range value, adjusting the step value according to the preset resistance value and adjusting the resistance value of the digital potentiometer, and then returning to Step III;

Step V, if the temperature value collected and obtained in Step III is included in the preset scene parameter threshold range, returning to Step III.

As another method, at least a first predetermined duration and a second predetermined duration are preset in Step II;

in Step IV, if the temperature value collected and obtained in the first predetermined duration of Step III is excluded in the preset temperature range value, adjusting the step value according to the preset resistance value and further adjusting the resistance value of the digital potentiometer;

after each step value is adjusted, judging whether the collected temperature value measured by the precise temperature measurement unit is included in the preset temperature range value in the second predetermined duration;

if the temperature value is included in the preset scene parameter threshold range, returning to Step III;

if the temperature value collected and obtained is excluded in the preset temperature range value, adjusting the step value according to the preset resistance value and adjusting the resistance value of the digital potentiometer, and then returning to Step III.

As a third method, at least a first predetermined duration, a second predetermined duration and a third predetermined duration are preset in Step II (as shown in FIG. 4);

in Step IV, if the temperature value collected and obtained in the first predetermined duration of Step III is excluded in the preset temperature range value, adjusting the step value according to the preset resistance value and further adjusting the resistance value of the digital potentiometer;

after each step value is adjusted, judging whether the collected temperature value measured by the precise temperature measurement unit is included in the preset temperature range value in the second predetermined duration;

if the temperature value is included in the preset scene parameter threshold range, returning to Step III;

if the temperature value collected and obtained is excluded in the preset temperature range value, adjusting the step value according to the preset resistance value and adjusting the resistance value of the digital potentiometer, and then returning to Step III and storing the number of adjusted steps.

after Step V, further comprises:

Step VI: after collecting the temperature value corresponding to the precise temperature measurement unit every third predetermined duration, comparing the obtained temperature value with the preset temperature range value, and judging whether the obtained temperature value is included in the preset range;

if the temperature value is included in the preset scene parameter threshold range, returning to Step III;

if the temperature value is excluded in the preset range value, controlling the resistance value of the digital potentiometer according to the number of adjusted steps which are stored at the last time, and then collecting the temperature value measured by the precise temperature measurement unit in real-time;

Step VII, if the temperature value is included in the preset scene parameter threshold range, returning to Step III;

if the temperature value is still excluded in the preset temperature value range, continuously adjusting the step value according to the resistance value until the collected temperature value measured by the precise temperature measurement unit is included in the temperature value range, storing the number of the current adjusted steps, and returning to Step III.

Above three methods are described below in examples:

Implementation Method 1:

1. Detecting whether the temperature value measured by the precise temperature measurement circuit is included within the preset range.

2. If the temperature value exceeds the preset range, adjust the step value according to the preset resistance value, controlling the resistance value of DDP until the collected temperature value measured by the precise temperature measurement circuit is included within the preset range (the step value may be adjusted many times according to the preset resistance value);

Implementation Method 2:

1. Detecting whether the temperature value measured by the precise temperature measurement circuit in the first predetermined duration is included within the preset range.

2. If the temperature value exceeds the preset range, adjusting the step value according to the preset resistance value, controlling the resistance value of DDP, and judging whether the collected temperature value measured by the precise temperature measurement circuit in the second predetermined duration is included within the preset range while adjusting the step value per time;

3. If the temperature value is included within the preset range, stop adjusting, or continuously adjusting the step value according to the preset resistance value until the collected temperature value measured by the precise temperature measurement circuit is included within the preset range;

Implementation Method 3:

1. Detecting whether the temperature value measured by the precise temperature measurement circuit is included within the preset range;

2. If the temperature value exceeds the preset range, adjusting the DDP resistance value according to the ways of method 1 or 2, and storing the number of adjusted step;

3. Presetting a third predetermined duration, detecting whether the temperature value measured by the precise temperature measurement circuit is included within the preset range in every time of third predetermined duration.

4. If the temperature value exceeds the preset range, controlling the DDP resistance value according to the number of adjusted step stored at the last time; if the collected temperature value measured by the precise temperature measurement circuit is excluded in the preset range, continuously adjusting the step according to the preset resistance value until the collected temperature value measured by the precise temperature measurement circuit is included within the preset range, and storing current number of adjusted step, and returning to step 3.

Normally, according to the implementation method 3, a DDP digital value can be preset in the first temperature calibration according to the temperature curve of the selected NTC resistor. While setting each value, the time for the heater to reach the final stable temperature is within 10 s. Supposing the second calibration and the first calibration are 10 days, and supporting the drift of NTC in 10 days is ±0.01° C., the changed value of NTC is only 2.4 ohm; in theoretical calculation, DDP only needs to be adjusted twice (namely ±3.9 ohm); adjustment time for each time is 5 s, and the new system can reach stable 37±0.02° C. Therefore, the second calibration time is very short, and is no more than 15 s. While within 10 days, CPU only works in the 15 s, thus, the interference probability of CPU is extremely low, it is only 15/(10*24*3600)=1.7*10 E-5, less than 2 per 100 000. Thus, the calibration method greatly improves the reliability of the system.

It should be noted that DDP, data latch and CPU can be connected through an SPI bus, and also can be connected through I2C or other data buses. Similarly, the precise temperature measurement circuit can be connected with CPU through SPI or other data buses.

Similarly, CPU part can adopt a single-chip, ARM, DSP or other processors.

The resistance value of DDP could be 1K, 2K or other resistance value. The segment number of the resistance value could be 256, 512 or more.

The precise temperature measurement resistor could be an RTD resistor, and further could be other precise thermistors. As long as the long-term stable performance reaches the demand that the yearly drift is less than ±0.01° C. All these obvious modifications should be deemed as the disclosed content of the present invention and within the claimed scope of the present invention. The present invention makes improvement under the basis of the previous temperature control circuit, and adopts self-calibration working way and excellent calibration temperature predication algorithm, thus, the performance is excellent; the long-term temperature precision of the system can be controlled in a range of ±0.02° C.; the occupation and interference probability of CPU are greatly reduced; and the reliability of the system is greatly improved. And the disadvantages that the conventional temperature control precision is low, the long-term drift is serious, the pulsating current radiation interference is large, CPU resource is occupied for a long time and CPU does not work due to overheating are completely solved.

The foregoing embodiments are only the preferred embodiments of the present invention and not intended to limit the present invention. Any modification, equivalent replacement and improvement made without departing from the spirit and principle of the present invention shall fall within the protection scope of the present invention.

The invention claimed is:

1. A self-calibration temperature control device, mainly comprising:
    a temperature feedback and control unit connected with a controlled heating element to control the work state thereof, a precise temperature measurement unit connected with the controlled heating element to measure a stable temperature thereof, and a temperature calibration unit connected with the precise temperature measurement unit and the temperature feedback and control unit;
    wherein the temperature calibration unit is configured for obtaining temperature from the precise temperature measurement unit, dynamically calibrating temperature drift, and inputting the calibrated result into the temperature control and feedback unit;
    wherein the temperature feedback and control unit comprises: a negative temperature coefficient thermistor and an analog feedback control circuit that are connected with the controlled heating element to control the final stable temperature of the controlled heating element reaching the setting value through the analog feedback control circuit;
    wherein the temperature calibration unit comprises: a CPU with a preset temperature range value and a preset resistance adjustment step value, being connected with the precise temperature measurement unit, a data latch circuit with an input end connected with the CPU through a bus, and a digital potentiometer connected with the temperature feedback and control unit, and an output end of the data latch circuit is connected with the digital potentiometer through the bus;
    wherein the CPU comprises: a judging unit configured for judging whether the temperature value measured by the precise temperature measurement unit is within a preset range, a calibration parameter storage module configured for storing historical calibration parameter data, and a digital potentiometer connection step setting module, the digital potentiometer connection step setting module being configured to determine an updated calibration parameter value according to the historic calibration parameter data, and further to adjust a step value according to a preset resistance value.

2. The self-calibration temperature control device according to claim 1, wherein the temperature feedback and control unit comprises an NTC thermistor, a precise setting resistor, a voltage reference circuit, a ½ voltage division circuit, a first buffer circuit, a second buffer circuit, an integrating circuit, an inverse proportional amplifier circuit, a voltage summing circuit, a level mapping circuit and a DC/DC module circuit, wherein:
    one end of the NTC thermistor is grounded and the other end of the NTC thermistor is connected with the precise setting resistor and further connected with a non-inverting input end of the first buffer circuit;
    one end of the precise temperature setting resistor is connected with an NTC resistor, and further connected with the non-inverting input end of the first buffer circuit, and the other end of the precise temperature setting resistor is connected with the digital potentiometer;
    the output voltage of the voltage reference circuit is connected with the digital potentiometer and the output voltage thereof is further connected with a first resistor of the ½ voltage division circuit;
    the ½ voltage division circuit comprises the first resistor, a second resistor and a first operational amplifier;
    the first resistor is connected with the output of the voltage reference circuit and the other end of the first resistor is connected with the second resistor and is further connected with the non-inverting end of the first operational amplifier;
    the first operational amplifier is connected into a voltage follower way, the inverting end of the first operational amplifier is connected with the output end, the output end of the first operational amplifier is connected with the non-inverting end of a third operational amplifier, and the output end of the first operational amplifier is further connected with the non-inverting end of a fourth operational amplifier;
    the first buffer circuit is structured by the voltage follower which is connected by a second operational amplifier;
    the second buffer circuit is structured by the voltage follower which is connected by the first operational amplifier;
    the non-inverting input end of the first operational amplifier is connected with the first resistor of the ½ voltage division circuit, the inverting end of the first operational amplifier is connected with the output end of the first operational amplifier, and the output end operating and amplifying the first operational amplifier is connected with the non-inverting end of the third operational amplifier which is operated and amplified by the integrator, and the output end operating and amplifying the first operational amplifier is further connected with the non-inverting end of the fourth operational amplifier which is operated and amplified by the inverse proportional amplifier circuit;
    the integrating circuit comprises a fifth resistor, a third operational amplifier and a feedback capacitor;

one end of the fifth resistor is connected with the buffer output end and is further connected with the third resistor, the other end of the fifth resistor is connected with the inverting input end of the third operational amplifier and is further connected with one end of the feedback capacitor, one end of the feedback capacitor is connected with the inverting end of the third operational amplifier, and the other end of the feedback capacitor is connected with the output end which operates and amplifies the third operational amplifier;

the output of the third operational amplifier is connected with a sixth resistor of the voltage summing circuit and the non-inverting end of the third operational amplifier is connected with the output end of the first operational amplifier in the buffer circuit;

the reverse proportion amplifier circuit comprises a fourth operational amplifier, a third resistor and a fourth resistor, the non-inverting end of the fourth operational amplifier is connected with the output end of the first operational amplifier, the inverting end of the fourth operational amplifier is connected with a common node formed by the third and fourth resistors, the other end of the third resistor is connected with the output of the second operational amplifier and is further connected with one end of the fifth resistor, one end of the fourth resistor is connected with the inverting end of the fourth operational amplifier and is further connected with the third resistor, and the other end of the fourth resistor is connected with the output of the fourth operational amplifier;

the voltage summing circuit consists of two equivalent sixth and seventh resistors, one end of the sixth resistor is connected with the output of the integrator, and the other end of the sixth resistor is connected with the seventh resistor, one end of the seventh resistor is connected with the output of the reserve proportion amplifier circuit, and the other end of the seventh resistor is connected with the sixth resistor;

the common node formed by the seventh resistor and the sixth resistor is connected with the input end of the level mapping circuit;

the level mapping circuit consists of a first voltage follower, a second voltage follower, an eighth resistor and a ninth resistor, the non-inverting end of the first voltage follower is connected with the common node formed by the sixth resistor and the seventh resistor of the voltage summing circuit, the inverting end of the first voltage follower is connected with the output, the output of the first voltage follower is further connected with one end of the eighth resistor, the other end of the eighth resistor is connected with a common node formed by the ninth resistor, this common node is connected with the non-inverting end of the second voltage follower, one end of the ninth resistor is connected with the eighth resistor and is further connected with the non-inverting end of the second voltage follower, and the other end of the ninth resistor is grounded;

the non-inverting end of the second voltage follower is connected with the eighth resistor and is further connected with the ninth resistor, the inverting end of the second voltage follower is connected with output, and the output of the second voltage follower is connected with one end of an eleventh resistor;

the DC/DC module circuit consists of a DC/DC chip and external discrete components, the external discrete component comprises an input capacitor, a boot capacitor, a freewheeling diode, an energy storage inductor and an output filter capacitor, the first output voltage and the second output voltage are provided with resistors, one end point of the input capacitor is connected with the DC/DC chip, and the other end thereof is grounded, and the DC/DC chip is connected with a power supply.

3. The temperature control device according to claim 1, wherein the precise temperature measurement unit comprises a resistance temperature detector (RTD) resistor and a precise temperature measurement circuit connected with the RTD resistor and two ends of the RTD resistor are connected with the precise temperature measurement circuit.

4. The temperature control device according to claim 3, wherein:
the temperature calibration unit comprises a digital potentiometer, a central processing unit (CPU) circuit and a data latch circuit;
the digital potentiometer is connected with the precise temperature setting circuit in series, one end of the digital potentiometer is connected with the precise setting resistor, and the other end of the digital potentiometer is connected with the output of the voltage reference circuit, the CPU circuit is connected with the precise temperature measurement circuit through a data bus interface, the input end of the data latch circuit is connected with the CPU circuit through a bus, and the output end of the data latch circuit is connected with the digital potentiometer through a bus.

5. The temperature control device according to claim 4, wherein the controlled heating element unit is provided within a heater line to heat a system to be measured, one end of the heater line is grounded, and the other of the heater line is connected with the output end of the DC/DC module circuit.

6. A temperature control method adopted for the temperature control device with the structure according to claim 1, comprising the steps as follows:
Step I, presetting a temperature range value and presetting a resistance adjustment step value;
Step II, presetting at least one predetermined time length;
Step III, after step II, collecting the temperature value corresponding to the precise temperature measurement unit in the predetermined duration, and comparing the obtained temperature value with the preset temperature range value;
Step IV, when the temperature value collected and obtained in Step III is excluded in the preset temperature range value, adjusting the step value according to the preset resistance value and adjusting the resistance value of the digital potentiometer, and then returning to Step III;
Step V, when the temperature value collected and obtained in Step III is included in the preset scene parameter threshold range, returning to Step III.

7. The temperature control method according to claim 6, wherein at least a first predetermined duration and a second predetermined duration are preset in Step II, further comprising:
in Step IV, when the temperature value collected and obtained in the first predetermined duration of Step III is excluded in the preset temperature range value, adjusting the step value according to the preset resistance value and further adjusting the resistance value of the digital potentiometer;
after each step value is adjusted, judging whether the collected temperature value measured by the precise temperature measurement unit is included in the preset temperature range value in the second predetermined duration;

if when the temperature value is included in the preset scene parameter threshold range, returning to Step III;

if when the temperature value collected and obtained is excluded in the preset temperature range value, adjusting the step value according to the preset resistance value and adjusting the resistance value of the digital potentiometer, and then returning to Step III.

8. The temperature control method according to claim 6, wherein at least a first predetermined duration, a second predetermined duration and a third predetermined duration are preset in Step II, further comprising:

in Step IV, when the temperature value collected and obtained in the first predetermined duration of Step III is excluded in the preset temperature range value, adjusting the step value according to the preset resistance value and further adjusting the resistance value of the digital potentiometer;

after each step value is adjusted, judging whether the collected temperature value measured by the precise temperature measurement unit is included in the preset temperature range value in the second predetermined duration;

if when the temperature value is included in the preset scene parameter threshold range, returning to Step III;

if when the temperature value collected and obtained is excluded in the preset temperature range value, adjusting the step value according to the preset resistance value and adjusting the resistance value of the digital potentiometer, and then returning to Step III and storing the number of adjusted steps; and after Step V:

a Step VI: after collecting the temperature value corresponding to the precise temperature measurement unit every third predetermined duration, comparing the obtained temperature value with the preset temperature range value, and judging whether the obtained temperature value is included in the preset range;

if when the temperature value is included in the preset scene parameter threshold range, returning to Step III;

if when the temperature value is excluded in the preset range value, controlling the resistance value of the digital potentiometer according to the number of the adjusted steps which is stored at the last time, and then collecting the temperature value measured by the precise temperature measurement unit in real-time;

Step VII, when the temperature value is included in the preset scene parameter threshold range, returning to Step III;

if when the temperature value is still excluded in the preset temperature value range, continuously adjusting the step value according to the resistance value until the collected temperature value measured by the precise temperature measurement unit is included in the temperature value range, storing the number of the current adjusted step, and returning to Step III.

9. The temperature control method according to claim 6, wherein at least a first predetermined duration and a third predetermined duration are preset in Step II, further comprising:

in Step IV, when the temperature value collected and obtained in the first predetermined duration of Step III is excluded in the preset temperature range value, adjusting the step value according to the preset resistance value and further adjusting the resistance value of the digital potentiometer;

if when the temperature value is included in the preset scene parameter threshold range, returning to Step III;

if when the temperature value collected and obtained is excluded in the preset temperature range value, adjusting the step value according to the preset resistance value and adjusting the resistance value of the digital potentiometer, and then returning to Step III and storing the number of the adjusted step; and after Step V:

a Step VI: after collecting the temperature value corresponding to the precise temperature measurement unit every third predetermined duration, comparing the obtained temperature value with the preset temperature range value, and judging whether the obtained temperature value is included in the preset range;

if when the temperature value is included in the preset scene parameter threshold range, returning to Step III;

if when the temperature value is still excluded in the preset range value, controlling the resistance value of the digital potentiometer according to the number of the adjusted steps which is stored at the last time, and then collecting the temperature value measured by the precise temperature measurement unit in real-time;

Step VII, when the temperature value is included in the preset scene parameter threshold range, returning to Step III;

if when the temperature value is still excluded in the preset temperature value range, continuously adjusting the step value according to the resistance value until the collected temperature value measured by the precise temperature measurement unit is included in the temperature value range, storing the number of the current adjusted steps, and returning to Step III.

* * * * *